United States Patent Office 3,178,393
Patented Apr. 13, 1965

3,178,393
FORMALDEHYDE-AROMATIC HYDROCARBON CONDENSATION PRODUCT PREPARED WITH A HYDROCARBON SULFONIC ACID
Preston L. Brandt and Joseph Z. Matt, Chicago, Ill., assignors to Velsicol Chemical Corporation, Chicago, Ill., a corporation of Illinois
No Drawing. Filed Aug. 10, 1960, Ser. No. 48,566
14 Claims. (Cl. 260—67)

This invention relates to the preparation of formaldehyde condensation products; more particularly, this invention relates to the preparation of formaldehyde-aromatic hydrocarbon condensation products catalyzed by hydrocarbon sulfonic acids.

The art of manufacturing condensation products of aldehydes and aromatic hydrocarbons has been practiced for several decades. One of the major obstacles in this field has been the lack of an inexpensive catalyst that neither requires regeneration nor separation from the condensation product, and does not hinder the preparation of light colored and water-white condensation products. In the past such catalysts as sulfuric acid have been utilized with varying degrees of success. For example, sulfuric acid is too powerful a catalyst and as a result highly polymerized cross-linked, long-chain polymers often are formed. Sulfuric acid has also been used in combination with various co-catalysts and complexes, such as clay, isopropyl ether, aluminum sulfate, ethyl acetate, and tetrahydrofuran.

While several of the sulfuric acid combinations, and several of the other aforementioned compounds, do catalyze the condensation reaction, the product obtained therefrom is very dark in color and cannot be appreciably lightened even with extensive treatment. Furthermore, since several of the aforementioned catalysts are expensive and the supply relatively limited, it is necessary to recover at least substantial quantities of the spent catalyst. Such recovery and the subsequent regeneration is uneconomical and often impossible to accomplish.

The process of the present invention produces light colored and water-white condensation products by use of catalytic compounds that are relatively inexpensive and that do not have to be recovered, or regenerated. It has now been found that relatively small amounts of a hydrocarbon sulfonic acid catalyze the formaldehyde-aromatic hydrocarbon condensation reaction, with the result that by subsequent treatment light colored to water-white condensation products can be recovered.

Thus, one object of the present invention is to provide a condensation reaction process utilizing a catalyst which will permit the preparation of light colored and water-white compounds.

Another object is to provide a process to prepare light-colored condensation products eliminating the necessity of recovery and regeneration of catalysts and solvents.

Another object of this invention is to provide a process for the production of condensation products which are suitable for use as plasticizers and extenders for polyvinylchloride resins.

These and other objects of the present invention will be apparent from the following description and examples:

The process of the present invention consists generally in reacting an aromatic hydrocarbon compound with formaldehyde by heating them in the presence of a hydrocarbon sulfonic acid and removing a substantial quantity of the water formed by the reaction, preferably as the water is formed as the reaction proceeds.

More specifically, the aromatic hydrocarbon compound is contacted with from about 0.5 to about 2 moles of formaldehyde per mole of aromatic hydrocarbon compound. The exact proportion of reactants is dependent upon the number of aryl rings desired in the condensed molecule. When a larger number of aryl hydrocarbon molecules, for example, xylene, are present than formaldehyde molecules, the following reaction occurs as the primary reaction:

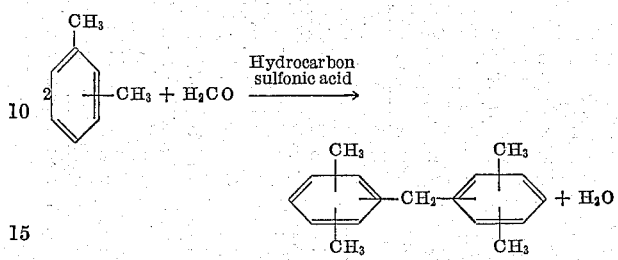

However, when a larger number of formaldehyde molecules, for example, xylene, the following reaction competes with the above reaction, forming higher polymerized products:

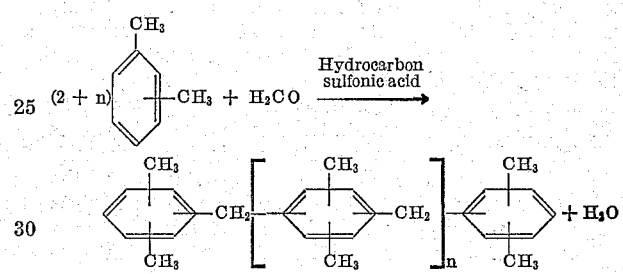

wherein $n$ is an integer greater than zero.

The product of the competing reaction may be cross-linked and may be insoluble in the aromatic solvents in which the product of the primary reaction is soluble.

Thus, the proportions of the reactants are selected in accordance with the desired product. The molecular weight of the product is also dependent upon the ratio of reactants, since long chain molecules have a higher molecular weight than short chain molecules.

Although all aromatic compounds containing an unsubstituted benzene-ring carbon atom are suitable as reactants for the process of this invention, toluene, o-xylene, m-xylene, p-xylene, ethylbenzene, methylethylbenzene, diethylbenzene, indene, methylindene, dimethylindene, tetrahydronaphthalene, naphthalene, methylnaphthalene, dimethylnaphthalene, and mixtures thereof are preferred reactants to form the light colored condensation products of this invention.

While the aromatic hydrocarbons heretofore described are suitable reactants for the process of the present invention, the following mono-aryl ring compounds are preferred to obtain optimum results and the least colored products: toluene, any of the three xylene isomers, and mixtures thereof, ethylbenzene, and methylethylbenzene. When a mixture of xylene isomers is utilized the meta-isomer will preferentially react. Thus, the meta-isomer may be substantially removed from a mixture of isomers by carefully controlling the reaction.

An excellent aromatic hydrocarbon mixture, commercially available and useful as a reactant in the present invention is technical xylene. Technical xylene consists mainly of the three isomers of xylene and ethylbenzene as an impurity in the following approximate proportions: o-xylene, 19%; m-xylene, 47%; p-xylene, 15%; and ethylbenzene, 19%. For the purposes of the process of this invention, ethylbenzene is not considered an impurity since it readily participates in the reaction as an aromatic hydrocarbon reactant.

The aromatic hydrocarbon and formaldehyde must be contacted in the presence of a hydrocarbon sulfonic acid.

Suitable acids are the alkane, cycloalkane, and arene sulfonic acids. While condensation products of excellent qualities are produced with the alkane and cycloalkane compounds, the arene compounds are preferred due to their commercial availability, their lower cost, and their greater solubility in hydrocarbon solvents. Broadly the sulfonic acid should be present in an amount of about 0.5 to 10 percent by weight of the reactants.

The arenesulfonic acids include such compounds as benzenesulfonic acid, toluenesulfonic acid, and xylenesulfonic acids. While benzenesulfonic acid is a satisfactory catalytic compound for this process, it is less soluble and presently more expensive than toluenesulfonic acid. Xylenesulfonic acid is generally less stable than toluenesulfonic acid. Toluenesulfonic acid, having good stability and other excellent qualities, is most preferred as the catalytic compound for the process of the present invention, although the other hydrocarbon sulfonic acids described herein may be used with equally good results.

Due to its availability, commercial p-toluene-sulfonic acid can be used as the catalytic compound in the present invention. Commercial p-toluenesulfonic acid contains about 80% p-toluenesulfonic acid, about 20% o-toluenesulfonic acid, and about 1½% sulfuric acid. While the commercial p-toluenesulfonic acid may be used as such, it is preferred to neutralize the sulfuric acid leaving toluenesulfonic acid as the only acid species present. Barium hydroxide, oxide, or carbonate is preferred as the neutralization agent since the sulfate salt thereof is insoluble and will not regenerate undesired sulfuric acid. It is also preferred to increase the acid strength of the p-toluenesulfonic acid by distilling off water to decompose any of the weaker p-toluenesulfonic acid hydrate.

The extent of the condensation reaction is at least partially dependent upon the amount of sulfonic acid present. When small amounts of sulfonic acid are used, for example, in the order of 0.5–2% by weight of reactants, the condensed product will contain a preponderance of 2-ring molecules, while utilization of larger quantities of catalytic compound, for example, in the order of above 10% yields a product containing molecules of a higher number of rings.

The formaldehyde is added either continuously or in small intermittent portions to the sulfonic acid-aromatic hydrocarbon mixture, which can be in an aliphatic or aromatic hydrocarbon solvent. Suitable aliphatic solvents are pentane, hexane, and heptane. The aromatic solvents, such as benzene, toluene, and xylene may react with the formaldehyde as they are often the same or a homolog of the aromatic hydrocarbon reactant, and thereby form a mixture of products. Such side reaction is not necessarily harmful to the product, and in fact, may improve the product properties.

The formaldehyde is preferably added slowly to maintain an excess of aromatic hydrocarbon, thereby aiding the primary reaction so that the product therefrom will have a low viscosity and will be composed preponderantly of two ring molecules. The formaldehyde is also preferably added slowly to control the course of the reaction. One mole of water is formed for every mole of formaldehyde used in the reaction. The water formed in the reaction weakens the activity of the sulfonic acid by hydration and dilution, and therefore, should be substantially removed as formed as the reaction proceeds. Reaction water is most easily removed by heating the reaction mixture to distill the water and/or reflux an azeotrope of water and aromatic hydrocarbon which boils at a temperautre dependent upon the aromatic hydrocarbon and solvent present. The vapors of said azeotrope or water are condensed in a reflux separation apparatus, such as a Dean-Stark trap. The water containing formaldehyde in solution is thus removed and its quantity measured. The amount of water recovered and its formaldehyde content provides a convenient method by which the extent of the reaction can be determined.

The process of the present invention is performed at an elevated temperature sufficient to distill the water present and/or reflux an azeotrope of the water of reaction and the aromatic hydrocarbon compound or solvent, whichever forms the lower boiling azeotrope with the water. Generally, a suitable temperature for such reaction is found in the range of from about 80° C. to about 180° C. A more preferred reaction temperature range is from about 80° C. to about 150° C. to insure even heating and hinder the loss of low boiling reactants. When any of the xylene isomers, or a mixture thereof, is used as the aromatic hydrocarbon reactant, a preferred reaction optimum temperature is from about 90° C. to about 145° C.

The polymer solution formed by the condensation reaction varies from very fluid to extremely viscous, depending upon the proportion of the reactants, the amount of sulfonic acid used, and the extent of the reaction permitted. To produce the light colored and often water-white products of the process of the present invention, the polymer solution prepared as above is treated to remove the excess sulfonic acid, paraformaldehyde, and colored polar compounds. Aliphatic and aromatic solvents may be added to the polymer solution if the polymer solution is too viscous for treatment.

While several types of treatment are suitable for removal of the sulfonic acid, paraformaldehyde and colored polar compounds, and while such treatments are comprehended by this invention, it is preferred to remove said compounds and fractions by passing the polymer solution through a bed of fuller's earth. Less than one pound of fuller's earth per pound of polymer solution is required for the treatment. The bed can subsequently be washed with a polar solvent, such as isopropyl alcohol, if it is desirable to remove the colored compounds and thus regenerate the clay for further treatment.

Other clarification treatments embodied in the process of this invention are: beds of clays and diatomaceous earths other than fuller's earth, fractional distillation, vacuum distillation, and molecular distillation.

After the colored polar compounds have been removed, the product solution is light colored and often water-white. The solution is next concentrated to the desired viscosity and product content by removal of a measured portion of the diluents present from the condensation reaction and from later diluent additions.

The following examples are set forth to illustrate, but not limit the present invention, and in each example there can be substituted for the aromatic hydrocarbon reactant and for the hydrocarbon sulfonic acid compound any other such materials falling within the previously described scope of the said reactant and the said compound.

*Example 1*

A 1-liter, 3-neck, round-bottom flask fitted with a mechanical stirrer, internal thermometer, efficient condenser, Dean-Stark trap, and a vapor-tight solid-addition side-arm tube, was charged with technical xylene (233 grams; 2.2 moles), hexane (28 cc.) and technical grade p-toluenesulfonic acid (6.25 g.). The solid acid hydrate is dissolved in approximately 10 ml. of water. Barium hydroxide [0.31 g. of $Ba(OH)_2.8H_2O$] was added to neutralize the sulfuric acid present in the technical p-toluenesulfonic acid. The contents of the flask were then heated to 120° C. with stirring to drive off water to yield anhydrous p-toluenesulfonic acid dissolved in xylene and hexane.

Paraformaldehyde flake (31 g., 1 mol) was added to the hot solution in portions through the side-arm tube over a period of about 1 hour, at a temperature of 120° C. The efficiency of the reaction was checked by observing the amount of water collected in the Dean-Stark trap. After the addition was completed, the reaction mixture was stirred for an additional one-half hour at 120° C. The reaction mixture was then cooled to room temperature.

The reaction mixture was poured into the top of a 1-inch diameter column of fuller's earth yielding a colorless solution of the product in solvent. The column was washed with several portions of hexane, the washings combined with the product solution, and the solvents stripped therefrom by distillation in vacuo to yield a colorless liquid product having a viscosity of Z–6 on the Gardner scale and a refractive index of 1.5870 at 25° C.

*Example 2*

A one-liter, 3-neck, round bottom flask fitted with a mechanical stirrer, internal thermometer, efficient condenser, Dean-Stark traps, and a vapor-tight solid-addition side-arm tube was charged with toluene (276 g., 3 moles) and technical p-toluenesulfonic acid (6.25 grams). The solid acid was dissolved in approximately 10 ml. of water. Barium hydroxide (0.31 g. of $Ba(OH)_2 \cdot 8H_2O$) was added to neutralize the sulfuric acid present in the technical p-toluenesulfonic acid. The contents of the flask were then heated to 120° C. with stirring to drive off water to yield an anhydrous solution of p-toluenesulfonic acid in toluene.

Paraformaldehyde (flake) (31 g., 1 mol) was added to the hot toluene solution in portions through the side-arm tube over a period of about 1 hour at 120° C. As in the previous example, the reaction was followed by observing the amount of water collected in the Dean-Stark trap. After the addition was completed, the reaction mixture was stirred for an additional one-half hour at 120° C. The reaction was then cooled to room temperature.

The reaction mixture was poured into the top of a 1-inch diameter column of fuller's earth yielding a colorless solution of the product in toluene. The column was washed with several portions of hexane, the washings combined with the product solution, and the solvents stripped therefrom by distillation in vacuo to yield a colorless liquid product having a viscosity of —A on the Gardner scale and a refractive index of 1.5740 at 25° C.

*Example 3*

A one-liter, 3-neck, round-bottom flask fitted with a mechanical stirrer, internal thermometer, efficient condenser, Deak-Stark trap, and a vapor-tight solid-addition side-arm tube was charged with technical xylene (286 g., 2.7 moles) and benzenesulfonic acid (6.1 g. of

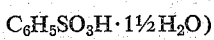

$C_6H_5SO_3H \cdot 1\frac{1}{2}H_2O$)

The solid acid was dissolved in approximately 10 mol. of water. Barium hydroxide [0.31 g. of $Ba(OH)_2 \cdot 8H_2O$] was added to neutralize the sulfuric acid present in the benzenesulfonic acid. The contents of the flask were then heated to 120° C. with stirring to drive off water.

Paraformaldehyde (flake) (31.2 g., 1 mol) was added to the hot xylene solution in portions through the side-arm tube over a period of about one hour at 120° C. The progress of the reaction was followed by observation of the water collected in the Dean-Stark trap. After the addition was completed, the reaction mixture was stirred for an additional one-half hour at 120° C. The reaction was then cooled to room temperature.

The reaction mixture was poured into the top of a 1-inch diameter column of fuller's earth yielding a solution of the product in xylene. The column was washed with several portions of hexane, the washings combined with the product solution, and the solvents stripped therefrom by distillation in vacuo to yield 134 g. of a slightly colored product having a viscosity of X+ on the Gardner scale and a refractive index of 1.5830 at 25° C.

*Example 4*

A one-liter, 3-neck, round-bottom flask fitted with a mechanical stirrer, internal thermometer, efficient condenser, Dean-Stark trap, and a vapor-tight solid inlet side arm tube, was charged with technical xylene (233 g., 2.2 moles), hexane (28 ml.), and $C_3$–$C_4$ alkane sulfonic acid (4.5 grams, primarily $C_4$ sulfonic acid). Barium hydroxide [0.31 g. of $Ba(OH)_2 \cdot 8H_2O$] was added to neutralize the sulfuric acid present in the alkane sulfonic acid. The contents of the flask were then heated to 120° C. with stirring to drive off water. Paraformaldehyde (flake) (31.2 g., 1 mol) was added to the hot solution in portions through the side-arm tube over a period of about one hour at 120° C. The progress of the reaction was followed by observation of the water collected in the Dean-Stark trap. After the addition was completed the reaction mixture was stirred for an additional one-half hour at 120° C. The reaction mixture was then cooled to room temperature.

The reaction mixture was poured into the top of a 1-inch diameter column of fuller's earth yielding a colorless solution of the product in solvent. The column was washed with several portions of hexane, the washings combined with the product solution, and the solvents stripped therefrom by distillation in vacuo to yield 91 grams of a colorless oil having a viscosity of E–F on the Gardner scale and a refractive index of 1.5732 at 25° C.

*Example 5*

A one-liter, three-neck, round-bottom flask fitted with a mechanical stirrer, internal thermometer, efficient condenser, Dean-Stark trap, and a vapor-tight solid-addition side-arm tube was charged with technical xylene (212 g., 2 moles), hexane (125 ml.), and p-toluenesulfonic acid (6.25 g.). The solid acid was dissolved in approximately 10 ml. water. Sodium hydroxide (13 ml. of a 0.1 N aqueous solution) was added to neutralize the sulfuric acid present in the p-toluenesulfonic acid. The contents of the flask were then heated to 96° C. with stirring to drive off water to yield an anhydrous solution of toluenesulfonic acid in solvent. Formaldehyde (33 g. of 91% para-formaldehyde flake) was added to the hot solution in portions through the side-arm tube over a period of about one hour at 94° C.

The reaction mixture was poured into the top of a 1-inch diameter column of fuller's earth yielding a solution of the product in solvent. The column was washed with several portions of hexane, the washings combined with the column effluent, and the solvents stripped therefrom by distillation in vacuo to yield 90 grams of an oil having a color of 1 on the Gardner color scale, a viscosity of B on the Gardner viscosity scale, and a refractive index of 1.5716 at 25° C.

*Example 6*

A 3-liter, 3-neck, round-bottom flask fitted with a mechanical stirrer, internal thermometer, efficient condenser, Dean-Stark trap, and a vapor-tight solid-addition side-arm tube was charged with 137–140° C. boiling point range ACS reagent grade xylene (848 g., 8 moles of 2.3° boiling point range xylene) and p-toluenesulfonic acid (30.6 g.). The contents of the flask were stirred and heated to and maintained at 140° C., while formaldehyde (66 g. of 91% paraformaldehyde flake) was added to the hot solution in portions through the side-arm tube over a period of about an hour at 140° C. After the addition was completed the reaction mixture was stirred for an additional half-hour at 140° C. The reaction mixture was cooled to room temperature and then the xylene was removed by distillation in vacuo. The oily liquid was weighed and an equal quantity by weight of hexane was added to the oil with stirring. The hexane solution was treated in the column of fuller's earth, as heretofore described, and the hexane was removed therefrom by distillation in vacuo to yield an almost colorless product having a color of —1 on the Gardner color scale, and a viscosity of B+ on the Gardner viscosity scale.

*Example 7*

A one-liter, 3-neck, round-bottom flask fitted with a mechanical stirrer, internal thermometer, efficient condenser, Dean-Stark trap, and a vapor-tight solid-addition side-arm tube, was charged with naphthalene (256 g., 2 moles), benzene (100 cc.) and p-toluenesulfonic acid (6.25 g.). The solid acid was dissolved in approximately 10 ml. of water. The acid solution was treated with barium hydroxide [0.31 g. of $Ba(OH)_2 \cdot 8H_2O$] to neutralize the sulfuric acid present in the sulfonic acid, and the reaction mixture was heated to 84° C. with stirring to drive off the water to form a solution of p-toluenesulfonic acid in naphthalene and benzene. Paraformaldehyde (flake) (31 g., 1 mole) was added to the hot solution in portions through the side-arm tube over a period of about one hour at 125° C. The reaction was followed by observing the amount of water collected in the Dean-Stark trap. After the addition was complete the reaction mixture was stirred for an additional one-half hour at 125° C. The reaction mixture was then cooled to room temperature, diluted with benzene (1 liter), and passed through a column of fuller's earth to yield a light colored solution of the product in solvent. The column was washed with several portions of benzene, the washings combined with the product solution, and the solvents and excess naphthalene stripped therefrom by steam distillation to yield a light colored resin with a softening point of 184° F.

The condensation products of this invention are useful as plasticizers for polyvinyl chloride resins and for copolymers of polyvinylchloride with other monomers due to their high compatibility with polyvinylchloride resins. The products of this invention are also useful as plasticizers for other resins, such as ethyl cellulose resins, benzyl cellulose resins, polystyrene resins, poly(vinylcarbazole) resins, and coumarone-indene resins. As plasticizers the products of this invention can be used to reduce the softening point of the resins and increase their tackiness. The plasticized resins, as described herein, are especially useful as a result of their weather resistance and their chemical and electrical inertness. Because of these excellent properties, the plasticized resins are useful in the manufacture of wire and cable insulation, upholstery, garden hose, gaskets, and the like. The resins can also be drawn out in thin sheets to form such products as shower curtains, draperies, garment bags, table mats, and the like.

The products of the present invention are also useful as plasticizers for polyvinylchloride resins used in the compounding of certain types of rubber blends, such as the nitrile rubbers.

We claim:

1. A process for the preparation of formaldehyde-aromatic hydrocarbon condensation products which comprises heating an aromatic hydrocarbon compound with formaldehyde in the presence of a hydrocarbon sulfonic acid said hydrocarbon sulfonic acid being substantially freed of sulfuric acid, and freed from its hydrate by removing water, therefrom; and separating and recovering a light colored condensation product by passing the reaction mixture through fuller's earth.

2. A process for the preparation of formaldehyde-aromatic hydrocarbon condensation products which comprises heating an aromatic hydrocarbon compound with formaldehyde in the presence of a hydrocarbon sulfonic acid, said hydrocarbon sulfonic acid being substantially freed of sulfuric acid, and freed from its hydrate by removing water therefrom; continuously removing a substantial quantity of the water as formed by the reaction; and separating and recovering a light colored condensation product by passing the reaction mixture through fuller's earth.

3. A process for the preparation of formaldehyde-aromatic hydrocarbon condensation products which comprises heating an aromatic hydrocarbon compound with formaldehyde in the presence of a hydrocarbon sulfonic acid at a temperature between about 80° C., and about 180° C., said hydrocarbon sulfonic acid being substantially freed of sulfuric acid by neutralizing with an agent therefor, and freed from its hydrate by removing water therefrom; continuously removing a substantial quantity of the water as formed by the reaction; and separating and recovering a light colored condensation product by passing the reaction mixture through fuller's earth.

4. A process for the preparation of light colored formaldehyde-aromatic hydrocarbon condensation products which comprises heating an aromatic hydrocarbon compound with from about 0.5 to about 2 moles of formaldehyde per mol of aromatic hydrocarbon in the presence of from about 0.5 to about 10% by weight of hydrocarbon sulfonic acid per total weight of reactants at a temperature between about 80° C. and about 180° C., said hydrocarbon sulfonic acid being substantially freed of sulfuric acid by neutralizing with an agent therefor, and freed from its hydrate by removing water therefrom; continuously removing a substantial quantity of the water as formed by the reaction; and separating and recovering a light colored condensation product therefrom by passing the reaction mixture through fuller's earth.

5. A process for the preparation of light colored formaldehyde-aromatic hydrocarbon condensation products which comprises heating an aromatic hydrocarbon compound with from about 0.5 to about 2 moles of formaldehyde per mol of aromatic hydrocarbon in the presence of from about 0.5 to about 10% by weight of an arene sulfonic acid per total weight of reactants at a temperature between about 80° C. and about 150° C., said hydrocarbon sulfonic acid being substantially freed of sulfuric acid by neutralizing with an agent therefor, and freed from its hydrate by removing water therefrom; continuously removing a substantial quantity of the water as formed by the reaction; and separating a light colored condensation product therefrom by passing the reaction mixture through fuller's earth.

6. The process of claim 5 wherein the arene sulfonic acid is toluenesulfonic acid.

7. The process of claim 5 wherein the arene sulfonic acid is benzenesulfonic acid.

8. The process of claim 5 wherein the arene sulfonic acid is xylenesulfonic acid.

9. A process for the preparation of light colored formaldehyde-aromatic hydrocarbon condensation products which comprises heating an aromatic hydrocarbon compound with from about 0.5 to about 2 moles of formaldehyde per mol of aromatic hydrocarbon in the presence of from about 0.5 to about 10% by weight of toluenesulfonic acid per total weight of reactants at a temperature between about 90° C. and about 145° C., said toluene sulfonic acid being substantially freed of sulfuric acid by neutralizing with an agent therefor selected from the group consisting of barium hydroxide, barium oxide and barium carbonate, and freed from its hydrate by distilling water therefrom; continuously removing a substantial quantity of the water as formed by the reaction; and separating and recovering a light colored condensation product therefrom by passing the reaction mixture through fuller's earth.

10. A process for the preparation of a light colored formaldehyde-aromatic hydrocarbon condensation product which comprises heating a mixture of isomeric xylenes with from about 0.5 to about 2 moles of formaldehyde per mol of mixture of isomeric xylenes in the presence of from about 0.5 to about 10% by weight of toluenesulfonic acid per total weight of reactants at a temperature between about 90° C. and about 145° C., said toluenesulfonic acid being substantially freed of sulfuric acid by neutralizing with an agent therefor selected from the group consisting of barium hydroxide, barium oxide and barium carbonate, and freed from its hydrate by distilling water therefrom; continuously removing a substantial quantity of the water as formed by the reaction; and separating and recovering a light colored condensation product therefrom by passing the reaction mixture through fuller's earth.

11. A process for the preparation of light colored formaldehyde-aromatic hydrocarbon condensation product which comprises heating m-xylene with from about 0.5 to about 2 moles of formaldehyde per mole of m-xylene in the presence of from about 0.5 to about 10% by weight of toluenesulfonic acid per total weight of reactants at a temperature between about 90° C. and about 145° C., said toluenesulfonic acid being substantially freed of sulfuric acid by neutralizing with an agent therefor selected from the group consisting of barium hydroxide, barium oxide and barium carbonate, and freed from its hydrate by distilling water therefrom; continuously removing a substantial quantity of the water as formed by the reaction; and separating and recovering a light colored condensation product therefrom by passing the reaction mixture through fuller's earth.

12. A process for the preparation of a light colored formaldehyde-aromatic hydrocarbon condensation product which comprises heating ethylbenzene with from about 0.5 to about 2 moles of formaldehyde per mol of ethylbenzene in the presence of from about 0.5 to about 10% by weight of toluenesulfonic acid per total weight of reactants at a temperature between about 90° C., and about 145° C., said toluenesulfonic acid being substantially freed of sulfuric acid by neutralizing with an agent therefor selected from the group consisting of barium hydroxide, barium oxide and barium carbonate, and freed from its hydrate by distilling water therefrom; continuously removing a substantial quantity of the water as formed by the reaction; and separating and recovering a light colored condensation product therefrom by passing the reaction mixture through fuller's earth.

13. A process for the preparation of a light colored formaldehyde-aromatic hydrocarbon condensation product which comprises heating naphthalene with from about 0.5 to about 2 moles of formaldehyde per mol of naphthalene in the presence of from about 0.5 to about 10% by weight of toluenesulfonic acid per total weight of reactants at a temperature between about 90° C. and about 145° C., said toluenesulfonic acid being substantially freed of sulfuric acid by neutralizing with an agent therefor selected from the group consisting of barium hydroxide, barium oxide and barium carbonate, and freed from its hydrate by distilling water therefrom; continuously removing a substantial quantity of the water as formed by the reaction; and separating and recovering a light colored condensation product therefrom by passing the reaction mixture through fuller's earth.

14. A process for the preparation of a light colored formaldehyde-aromatic hydrocarbon condensation product which comprises heating a dimethylnaphthalene with from about 0.5 to about 2 moles of formaldehyde per mol of dimethylnaphthalene in the presence of from about 0.5 to about 10% by weight of toluenesulfonic acid per total weight of reactants at a temperature between about 90° C. and about 145° C., said toluenesulfonic acid being substantially freed of sulfuric acid by neutralizing with an agent therefor selected from the group consisting of barium hydroxide, barium oxide and barium carbonate, and freed from its hydrate by distilling water therefrom; continuously removing a substantial quantity of the water as formed by the reaction; and separating and recovering a light colored condensation product therefrom by passing the reaction mixture through fuller's earth.

References Cited by the Examiner

UNITED STATES PATENTS

| 2,397,205 | 3/46 | Rummelsburg | 260—67 |
| 3,000,859 | 9/61 | Mirviss et al. | 260—67 |
| 3,035,023 | 5/62 | Imoto et al. | 260—67 |

FOREIGN PATENTS 666,873  2/52  Great Britain.

OTHER REFERENCES

Perry: Chemical Engineers' Handbook (1950, 3rd edition), McGraw-Hill Book Co., New York, page 969.

WILLIAM H. SHORT, *Primary Examiner.*

MILTON STERMAN, H. N. BURSTEIN, *Examiners.*